US006480356B1

United States Patent
Mos, Sr. et al.

(10) Patent No.: US 6,480,356 B1
(45) Date of Patent: Nov. 12, 2002

(54) MAGNETIC HEAD TRANSDUCER SPRING ASSEMBLY AND METHOD OF MAKING SAME

(75) Inventors: Robert J. Mos, Sr., San Diego; Robert J. Mos, Jr., Chula Vista; Clay von Mueller, San Diego, all of CA (US); Miguel Duenas, Tijuana (MX)

(73) Assignee: Semtek Innovative Solutions, Inc., San Diego, CA (US)

( * ) Notice: Subject to any disclaimer, the term of this patent is extended or adjusted under 35 U.S.C. 154(b) by 0 days.

(21) Appl. No.: 09/570,682

(22) Filed: May 15, 2000

(51) Int. Cl.[7] .......................... G11B 5/105; G11B 21/16
(52) U.S. Cl. ...................................... 360/129; 360/240
(58) Field of Search .............................. 360/2, 129, 240, 360/261.1, 261.2, 261.3, 291, 291.1, 291.2, 291.3, 241, 241.3; 235/449

(56) References Cited

U.S. PATENT DOCUMENTS

| | | | | |
|---|---|---|---|---|
| 3,668,668 A | * | 6/1972 | Robitschek | 267/158 |
| 3,890,644 A | * | 6/1975 | Goetzinger et al. | 360/101 |
| 4,297,735 A | * | 10/1981 | Eppich | 360/130.3 |
| 4,538,191 A | * | 8/1985 | Suzuki et al. | 360/291 |
| 4,616,355 A | * | 10/1986 | Kasahara | 369/44.12 |
| 4,841,396 A | * | 6/1989 | Kawasaki | 360/245.6 |
| 4,943,881 A | * | 7/1990 | Isozaki et al. | 360/245.6 |
| 4,998,174 A | * | 3/1991 | Wada et al. | 360/234.3 |
| 5,091,811 A | * | 2/1992 | Chang | 360/2 |
| 5,148,341 A | * | 9/1992 | Fehrenbach et al. | 360/267.5 |
| 5,270,523 A | * | 12/1993 | Chang et al. | 235/449 |
| 5,285,324 A | * | 2/1994 | Weigand et al. | 360/130.32 |
| 5,469,313 A | * | 11/1995 | Isozaki et al. | 352/92 |

FOREIGN PATENT DOCUMENTS

| | | | |
|---|---|---|---|
| JP | 59-229775 | * | 12/1984 |
| JP | 60-143490 | * | 7/1985 |
| JP | 61-134915 | * | 6/1986 |
| JP | 7-161159 | * | 6/1995 |

* cited by examiner

*Primary Examiner*—David L. Ometz
(74) *Attorney, Agent, or Firm*—Richard D. Clarke

(57) ABSTRACT

A magnetic head assembly with dual parallelogram supporting structure device and method of making the same has a single or multiple track magnetic stripe read head transducer mounted to a support structure by a dual parallelogram spring structure. This dual spring structure allows the head to move perpendicularly and rotationally to the magnetic stripe while preventing the head from rotating in the y direction, namely, preventing lateral movement. The novel magnetic head assembly is produced using a rapid and accurate assembly without the use of mounting screws in single and multiple track configurations. The unique spring also reduces wear on the magnetic heads which increases the functional life of the unit. The simple construction allows inexpensive manufacture of the magnetic head assembly, yet the durability of available manufacturing materials and the structure of the spring provide the magnetic head assembly with a long useful life, requiring little or no maintenance expense or upkeep.

20 Claims, 6 Drawing Sheets

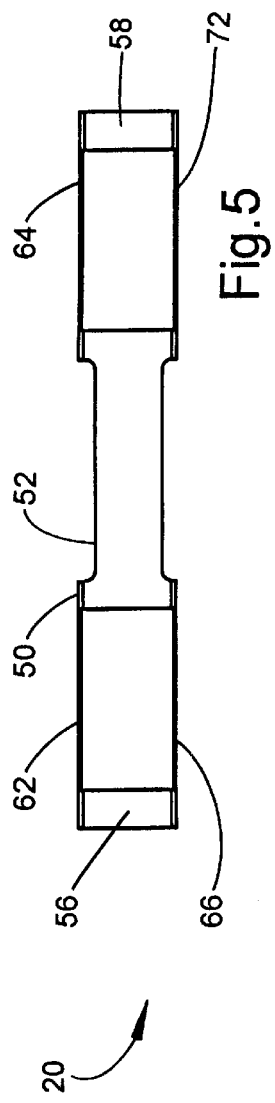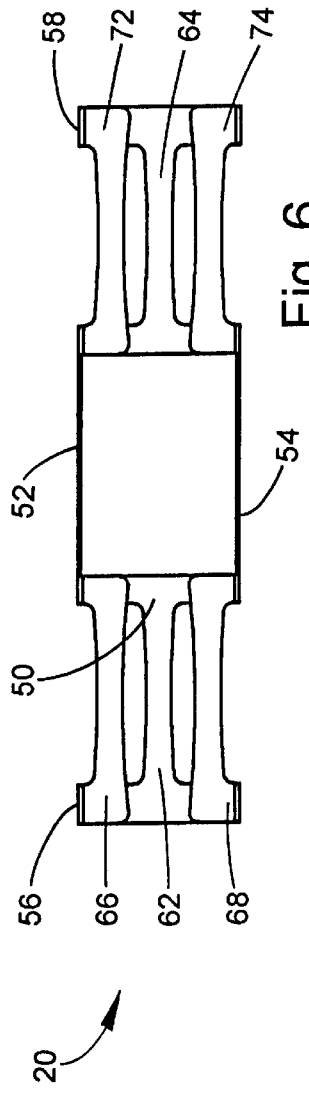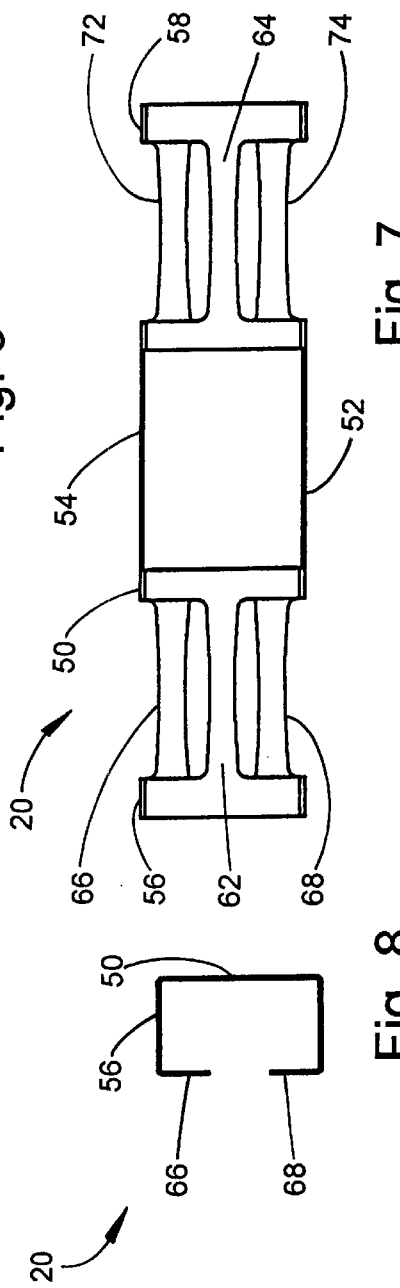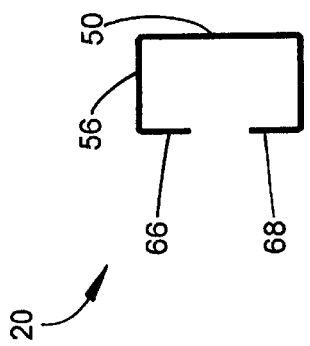

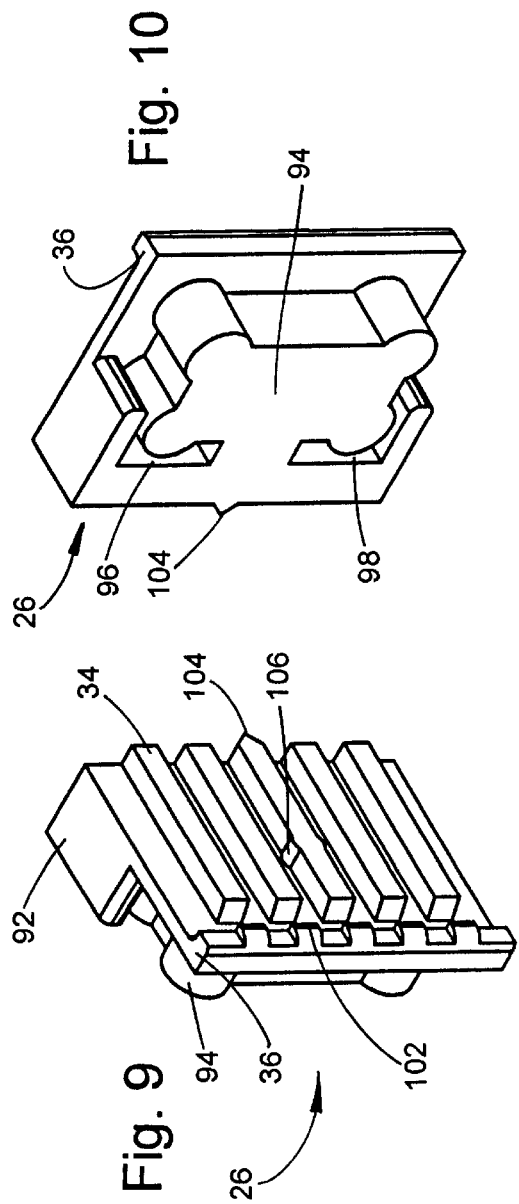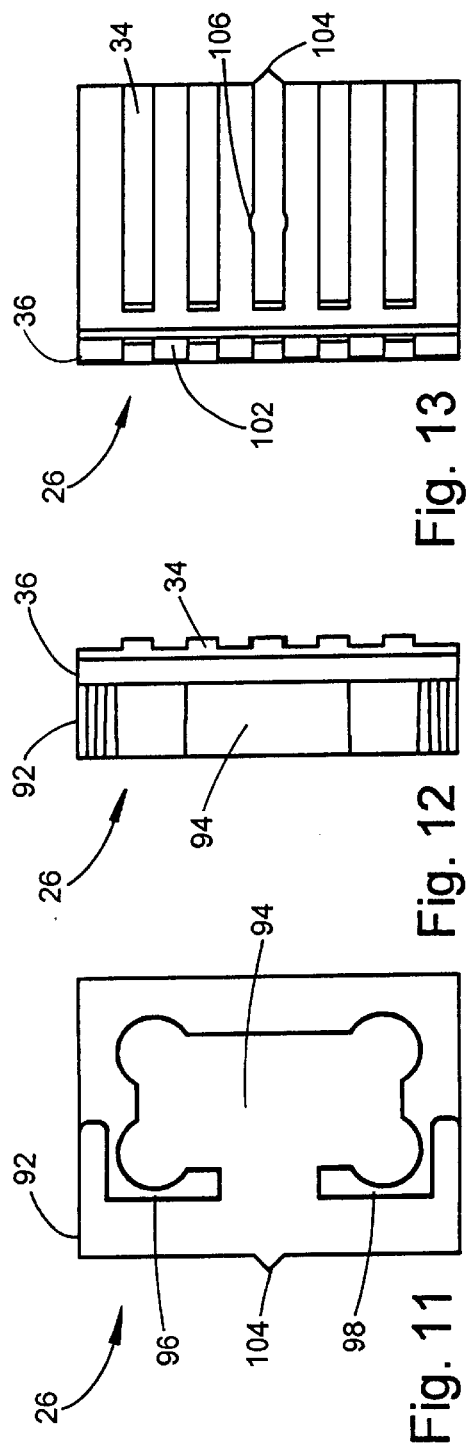

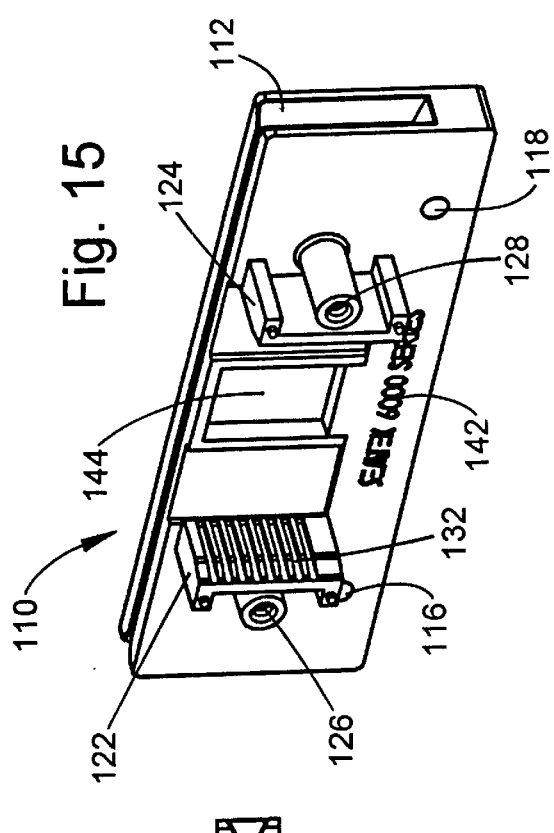
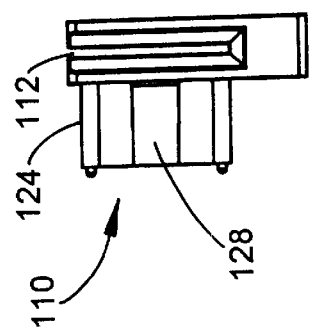
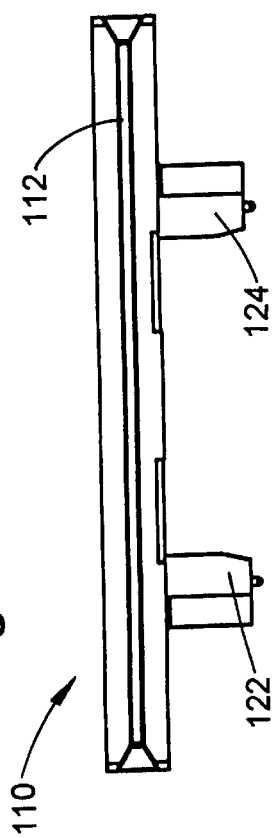
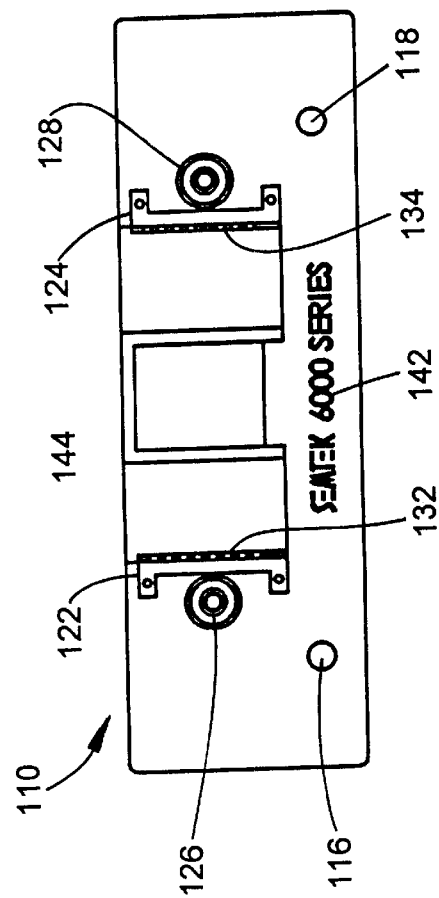

MAGNETIC HEAD TRANSDUCER SPRING ASSEMBLY AND METHOD OF MAKING SAME

BACKGROUND OF THE INVENTION

1. Field of the Invention

The present invention relates to a new and improved magnetic head transducer assembly with a torsion box spring frame and method of making same. More particularly, the present invention relates to a magnetic head transducer assembly which enables reduction of lateral movement caused by head mounts supporting the magnetic transducer during the reading and writing of information on a single or multiple track magnetic stripe. The novel magnetic head mounting assembly device is comprised of a single or multiple track magnetic tripe read head transducer mounted to a support structure by means of a dual parallelogram spring structure.

2. Description of the Related Art

Our society is becoming increasingly dependent upon information encoded within magnetic stripes used in such applications as credit cards, security cards and a variety of related magnetic media. Often these cards become warped during the course of usage and exposure to environmental factors. Today's rapid paced informational society is placing increased demands on electronic equipment to perform accurately, dependably, quickly and economically, even under such circumstances.

The necessity and usefulness of devices which encode and decode the information on such cards are well known. Examples of another type and kind of device for decoding information on magnetic strips is disclosed in U.S. Pat. No. 4,028,734.

In general, the structure and function of most magnetic stripe readers and encoders involve a single or multiple transducer heads mounted on a support structure. This support structure allows for limited movement of the head against the magnetic stripe.

Such a device is described in U.S. Pat. No. 4,028,734. The device a magnetic strip head assembly comprised of a support for transducer heads with leaf springs which permit the transducer head to move on a single axis to conform to any deformities in a card supporting a magnetic stripe.

The device is unidirectional in its usage when encoding and decoding information on and from magnetic stripes. Any attempt to run the card in the opposite direction leads to lateral movement, or jitter, of the transducer head making encoding and decoding of information impossible due to the fact that the transducer head is not in constant contact with the magnetic stripe.

In addition, the configuration of the device only allows for transducer head movement on the x axis and does not compensate for warping along the z axis. There is no mechanism provided for this device which would restrict movement of the head on the longitudinal or y axis. This longitudinal movement of the transducer head leads to jitter in the encoding and decoding process which cause variations in the placement of the encoded data bits.

Furthermore, the structure and configuration of the leaf springs cause wear on the assembly. The assembly is relatively work intensive to manufacture and both of these factors make the assembly expensive to maintain, replace and manufacture.

Therefore, it would be highly desirable to have a new and improved device and method for making same for a magnetic head mounting device and method of making same that would provide for movement in the z and x axes of the magnetic head force against the magnetic media with a parallel action, with restrictive movement on the y axes to prevent longitudinal movement while reading or encoding the data off of or on to magnetic media and which would be durable and economically manufactured.

SUMMARY OF THE INVENTION

Therefore, the principal object of the present invention is to provide a new and improved magnetic head transducer assembly device and method for making same. This magnetic head assembly would greatly reduce lateral movement or jitter of the magnetic head during the process of encoding and reading information stored on magnetic stripes by providing a double parallelogram torsion box spring frame for mounting the magnetic head.

It is a further object of the present invention to provide accurate encoding and decoding of data and processing of data by precisely measuring the distance between flux reversals allowing for overwrite or modifications of encoded data.

It is a yet a further object of the present invention to provide such a new and improved device and method for making same, magnetic head transducer assembly, with a snap action installation for head and spring assembly for easy and economical assembly.

Briefly, the above and further objects of the present invention are realized by providing a new and improved magnetic head transducer assembly and method of making same. This magnetic head assembly would have a single or multiple track magnetic stripe read head transducer mounted to a support structure by means of a dual parallelogram spring structure. The spring enables torsional and perpendicular movement of the magnetic head transducer during magnetic strip card transduction operations while preventing the head from rotating. The novel magnetic head assembly is provided with a means for rapid assembly without the use of mounting screws in single and multiple track configurations. The unique spring also reduces wear on the magnetic heads which increases the functional life of the unit. It also prevents the transducer from vibrating due to the action of springs on both sides of the transducer. This allows for the bi-directional reading and encoding without contributing to jitter. The novel locking means for the assembly allows inexpensive manufacture of the magnetic head assembly, yet the durability of available manufacturing materials and the structure of the spring provide the magnetic head assembly with a long useful life with little or no maintenance expense involved with upkeep.

BRIEF DESCRIPTION OF THE DRAWINGS

The above mentioned and other objects and features of this invention and the manner of attaining them will become apparent, and the invention itself will be best understood, by reference to the following description of the embodiment of the invention in conjunction with the accompanying drawings, wherein:

FIG. 5 is a top view of the novel of a dual parallelogram supporting spring structure according to the present invention;

FIG. 6 is a front view of the novel of a dual parallelogram supporting spring structure according to the present invention;

FIG. 7 is a posterior view of a of a dual parallelogram supporting spring structure, according to the present invention;

FIG. 8 is a side view of the of a dual parallelogram supporting spring structure according to the present invention;

FIG. 9 is a posterior elevational perspective view of the novel end cap according to the present invention;

FIG. 10 is a front elevational perspective view of the novel end cap according to the present invention;

FIG. 11 front view of the novel end cap according to the present invention;

FIG. 12 is a side view of the novel end cap according to the present invention;

FIG. 13 is a posterior view of the novel end cap according to the present invention;

FIG. 14 is a top view of another embodiment of the magnetic head mounting assembly device according to the present invention;

FIG. 15 is a front elevational perspective view of another embodiment of the magnetic head mounting assembly device according to the present invention;

FIG. 16 is a front view of another embodiment of the magnetic head mounting assembly device according to the present invention; and FIG. 17 is a side view of another embodiment of the magnetic head mounting assembly device.

DESCRIPTION OF THE PREFERRED EMBODIMENTS

Figure 1:
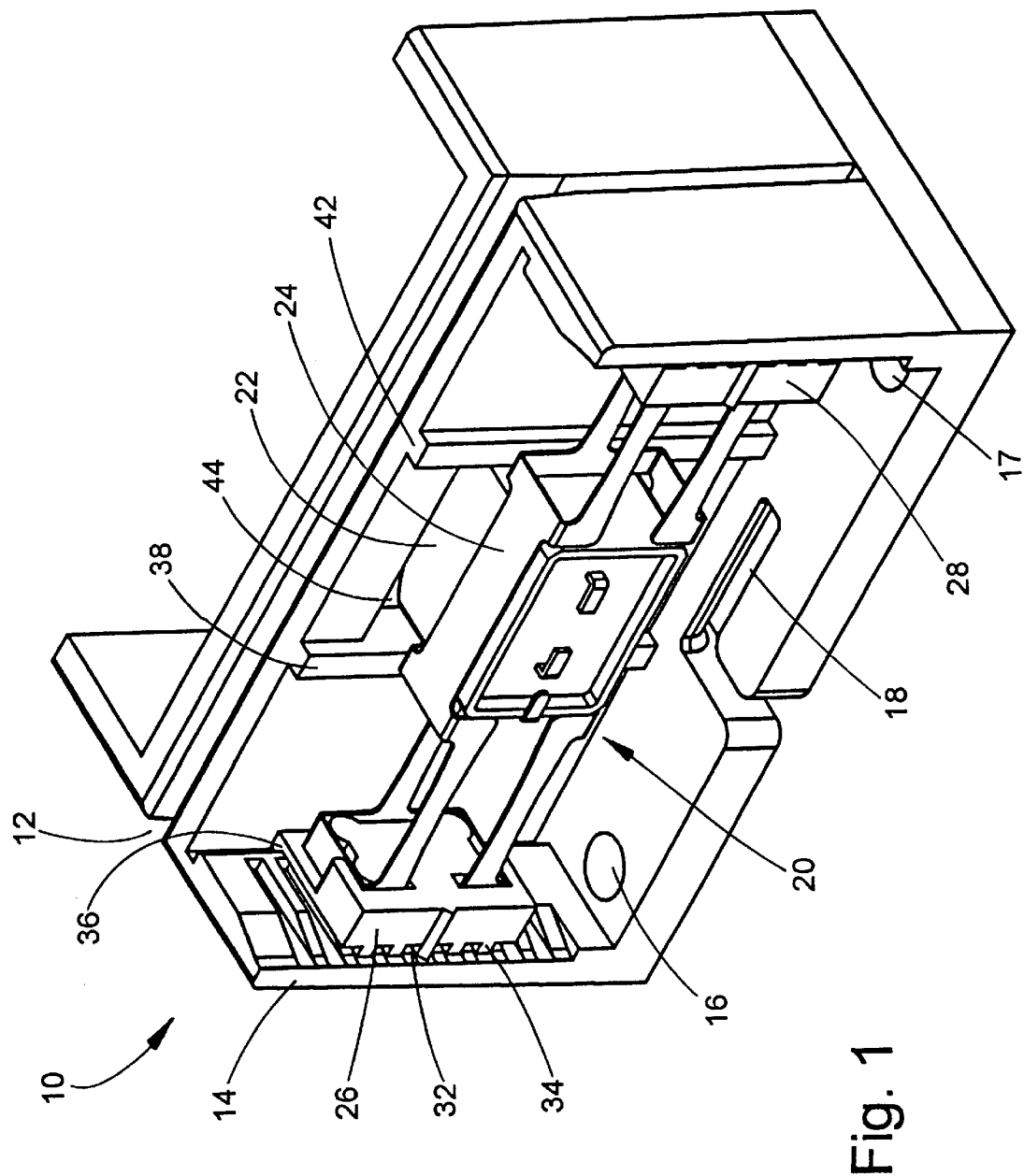
FIG. 1 is a front elevational perspective view of the novel magnetic head assembly.

Referring now to the drawings, and more particularly to FIG. 1 thereof, there is shown a new magnetic head mounting assembly 10 which is constructed in accordance with the present invention.

Referring to FIG. 1, the magnetic head mounting assembly 10 has a card slot 12 to accept magnetic strip media which longitudinally bisects the card head support rail housing 14. The mounting holes 16 and 17 accept a variety of means of connections including but not limited to pins, welds, screws, rivets or retainer clips that may be used to attach the assembly to an external housing. The wire termination exit groove 18 provides access for wires from the magnetic head transducer 22 to a decoding printed circuit board. The dual parallelogram supporting spring structure 20 provides a support structure for the magnetic head transducer 22 by providing a cradle, the spring structure 24 (torsion box). The novel dual spring structure 20 allows the head to move perpendicularly and torsionally to the magnetic stripe while preventing the head from rotating thus preventing head mount induced jitter during the flux reading and writing process. This flexibility of movement prevents wear on the magnetic head transducer 22 and lengthens the useful life same.

The end caps 26 and 28 attach frictionally to the end portions of the dual parallelogram supporting spring structure 20. The end caps have a plurality of end cap track mating protrusions 34 which fit into a plurality of molded in track locating grooves 32 located on the supporting card rail 14. The end cap integral locking mechanism 46 then provides a snug anchor which prevents accidental movement of the dual parallelogram supporting spring structure 20 after it has been mounted on the supporting card rail 14. The novel locking means facilitates quick, uniform and economical methods for assembly and manufacture.

The housing head positioning rails 38 and 42 are located on either side of the magnetic head access aperture 44. The housing head positioning rails 38 and 42 act as head penetration stops for the magnetic head transducer 22. The magnetic head access aperture 44 allows the magnetic head transducer 22 to be in contact with the magnetic stripe on the magnetic stripe media as it passes through the card slot 12.

Figure 2:
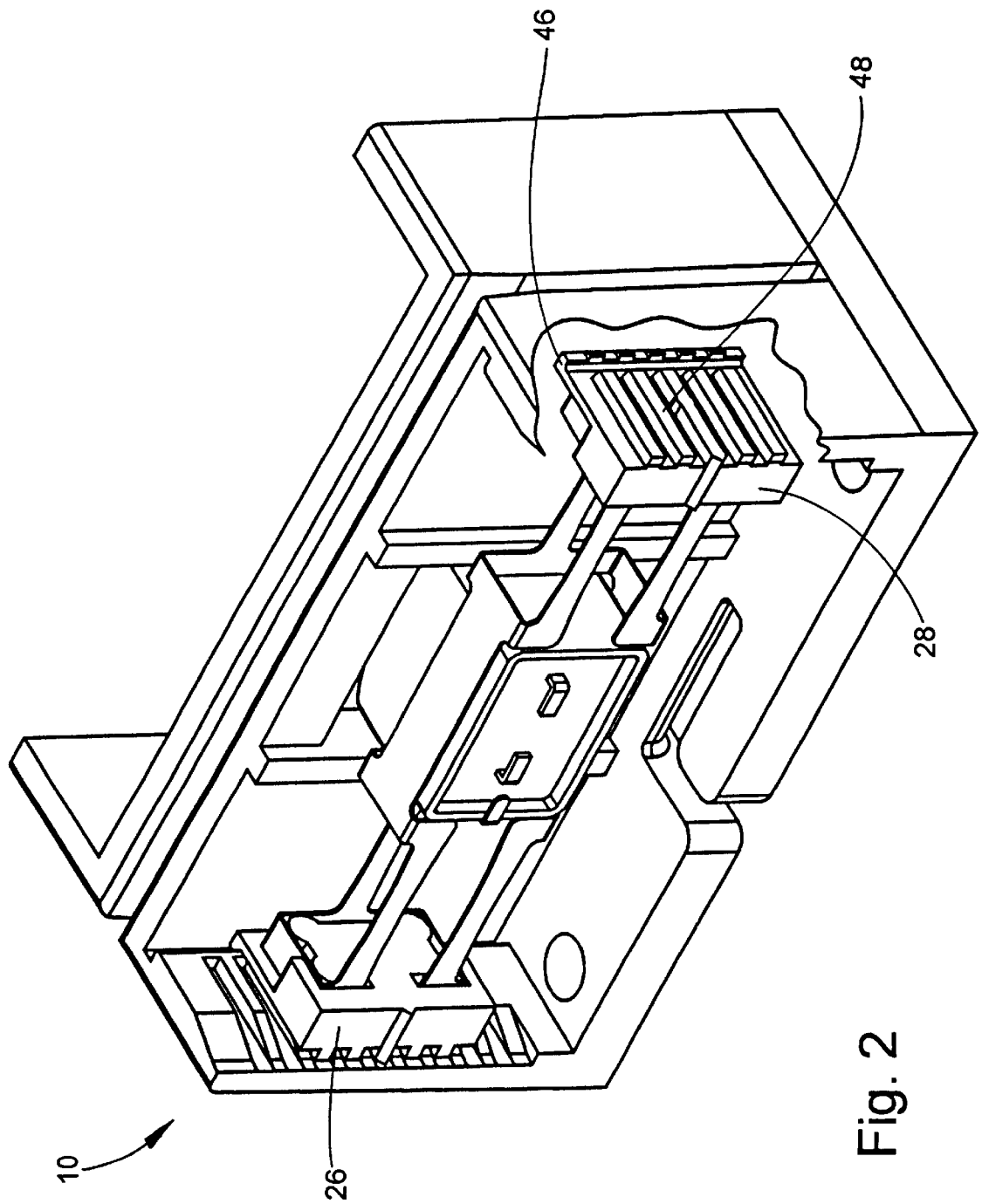
FIG. 2 is a partially cut away front elevational perspective view of the novel magnetic head assembly according to the present invention revealing the end cap track as it would appear when mounted in the support structure.

Turning now to FIG. 2 to illustrate the magnetic head mounting assembly 10 and especially to show the end cap integral locking mechanism 46 and the plurality of end cap track mating protrusions 48 on the outer periphery of the end caps 26 and 28 as seen in this partially cut away front elevational perspective view.

Figure 3:
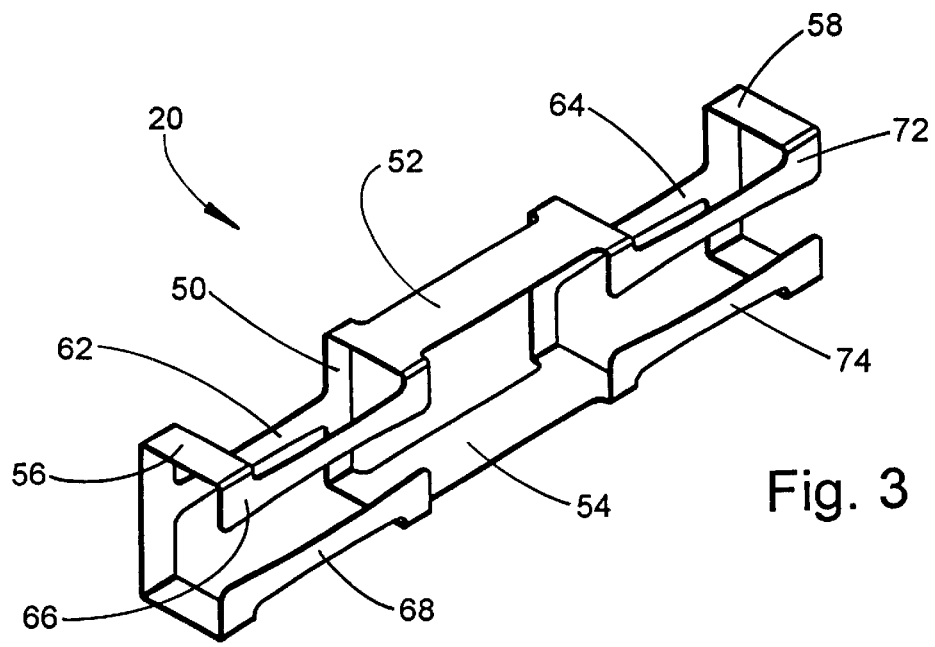
FIG. 3 is a front elevational perspective view of a dual parallelogram supporting spring structure according to the present invention.

Referring now to FIG. 3, this view of the dual parallelogram supporting spring structure 20 illustrates the structure of the unique mechanism. The upper head mount surface 52 and lower head mount surface 54 are connected by means of the two vertical leaf support frames as illustrated by leaf support frame 50. These are the surfaces which will be in direct contact to the magnetic head transducer 22. The leaf spring torsional members 62 and 64 are located between end cap retaining surfaces 56 and 58 and the vertical leaf support frames as illustrated by leaf support frame 50. The upper head mount surface 52 and the lower head mount surface 54 are connected to the end cap retaining surfaces 56 and 58 by means of the horizontal leaf spring members 66, 68, 72 and 74.

Figure 4:
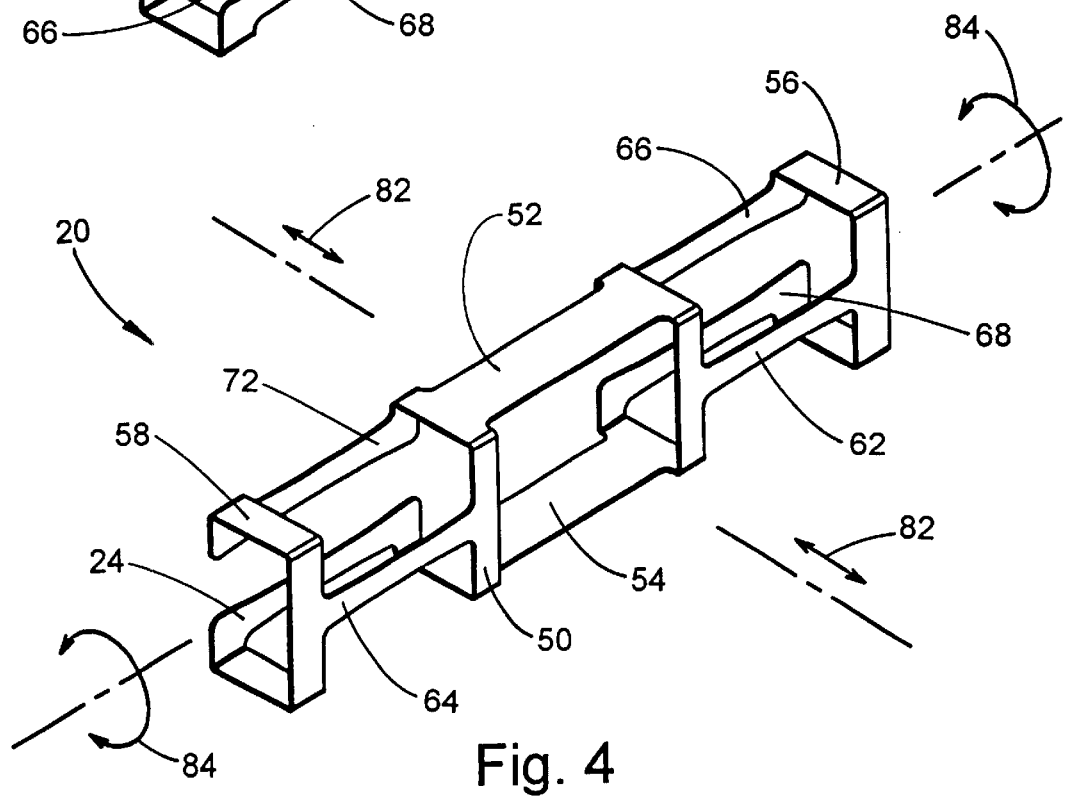
FIG. 4 is a posterior elevational perspective view of the of a dual parallelogram supporting spring structure according to the present invention showing x axis and rotational movement of the spring structure.

Turning now to FIG. 4, this view of the novel dual parallelogram supporting spring structure 20 illustrates the movement of the novel dual parallelogram supporting spring structure 20. Arrows 84 indicate torsional movement of the novel dual parallelogram supporting spring structure 20 which is facilitated by concurrent flexion of the leaf spring torsional members 62 and 64 as well as the leaf spring members 66, 68, 72, and 74. Arrows 82 indicate perpendicular movement of the novel dual parallelogram supporting spring structure 20 which would be greatest in the centrally located upper head mount surface 52, lower head mount surface 54 and leaf support frames as exemplified by leaf support frame 50. The end cap retaining surfaces 56 and 58 would display the least amount of either perpendicular or torsional movement when mounted. While the novel dual parallelogram supporting spring structure would provide perpendicular and torsional movement, it restricts longitudinal movement of the magnetic head transducer 22, thus restricting jitter (variations in the placement of the encoded data bits) in the decoding process.

Considering now a top view of the novel dual parallelogram supporting spring structure 20 in FIG. 5, the upper head mount surface 52 with leaf support frames as exemplified by leaf support frame 50 is illustrated. The leaf spring torsional members 62 and 64 as well as the leaf spring members 66 and 74 are attached to the end cap retaining surfaces 56 and 58.

A posterior view of the novel dual parallelogram supporting spring structure 20 is illustrated in FIG. 6. The horizontal leaf spring torsional members 62 and 64 and the leaf spring members 66, 68, 72, and 74 attach to the end cap retaining surfaces 56 and 58. The portions of the vertical leaf support frames as exemplified by leaf support frame 50 are seen as well as the side views of the upper head mount surface 52 and the lower head mount surface 54.

FIG. 7 is an anterior view of the dual parallelogram supporting spring structure 20 with vertical leaf support frames as exemplified by leaf support frame 50 on either side and supporting the upper head mount surface 52 and the lower head mount surface 54. The horizontal leaf spring torsional members 62 and 64 and the leaf spring members 66, 68, 72, and 74 attach to the end cap retaining surfaces 56 and 58.

Turning now to FIG. 8, an end view of the dual parallelogram supporting spring structure 20, which shows the end cap retaining surface 56, leaf support frame 50, and the leaf spring members 66 and 68.

Considering now FIG. 9, an elevated posterior perspective view of an end cap 26, showing the end cap integral locking mechanism 36 which incorporates a plurality of locking mechanism tabs 102. The top of the end cap frame together with the spring end cap retaining block provide a frictional fit with the dual parallelogram supporting spring structure 20. A plurality of end cap track mating protrusions 34 slide into a plurality of molded in track locating grooves 32 on the card head support rail housing 14 thus providing a frictional fit. The track locating/identifying tab 104 aids the assembler as a quick reference to placement of the end cap in a marked groove on the head support rail housing thus preventing the possibility of misalignment of the two end caps 26 and 28 relative to one another during assembly. The friction fit tab 106 provides additional friction between the end cap tracking protrusions 34 and the plurality of molded in track locating grooves 32 on the card head support rail housing 14.

Turning now to FIG. 10, which illustrates an elevated frontal perspective view of an end cap 26. The end cap integral locking mechanism 36 can be seen along with the track locating/identifying tab 104. The spring end cap retaining block 94 along with the spring retaining slots 96 and 98 provide a friction fit mechanism for the dual parallelogram supporting spring structure 20.

FIG. 11 is a front view of an end cap 26. The space between the end cap frame 92 and the spring end cap retaining block 94 form the spring retaining slots 96 and 98. The end cap retaining surface 56 of the dual parallelogram supporting spring structure 20 fits snugly around the spring end cap retaining block 94 forming a snug frictional fit and into the spring retaining slots 96 and 98.

Referring now to FIG. 12, a side view of an end cap 26, shows the end cap frame 92 and the spring end retaining block 94. The end cap integral locking mechanism 36 which support a plurality of end cap track mating protrusions 34 is also illustrated.

A top view of an end cap 26 is illustrated in FIG. 13. The end cap integral locking mechanism 36 with the plurality of locking mechanism tabs can be seen. The plurality of end cap tracking mating protrusions 34 has a track locating/identifying tab for ease of assembly along with a friction fit tab 106.

Another possible embodiment 110 of the magnetic head mounting assembly is illustrated is shown in FIG. 14. Here, a top view of another embodiment illustrates a card slot 112 with support rail housing 122 and 124.

FIG. 15 is an elevated frontal perspective view of the second possible embodiment 110 of the magnetic head mounting assembly showing a magnetic head access aperture 144 with support rail housing 122 and 124 on either side of the magnetic head access aperture 144. The support rail housing 122 and 124 have a plurality of molded in track locating grooves 132. The threaded holes 126 and 128 provide access for screws. The mounting holes 116 and 118 may accommodate a variety of attachment mechanisms including but not limited to pins, welds, screws, rivets or retainer clips for attachment to an external housing.

Referring now to FIG. 16 which is a front view of the second possible embodiment 110 of the magnetic head mounting assembly. Again, the magnetic head access aperture 144 with support rail housing 122 and 124 on either side of the magnetic head access aperture 144. The support rail housing 122 and 124 have a plurality of molded in track locating grooves 132. The threaded holes 126 and 128 provide access for screws. This magnetic head mounting assembly may be mounted to a separate housing by means of a variety of mechanisms through the mounting holes 116 and 118.

Considering now FIG. 17, a side view of the second possible embodiment 110 of the magnetic head mounting assembly, which clearly shows the card slot 112, support rail housing 124 and a threaded hole 128.

It should be understood, however, that even though these numerous characteristics and advantages of the invention have been set forth in the foregoing description, together with details of the structure and function of the invention, the disclosure is illustrative only, and changes may be made in detail, especially in matters of shape, size, chemistry and arrangement of parts within the principal of the invention to the full extent indicated by the broad general meaning of the terms in which the appended claims are expressed.

What is claimed is:

1. A magnetic head transducer mounting system spring comprising:
    (a) dual parallelogram spring means having a unitary body and C-shaped profile structure, whereby said dual parallelogram spring means solely supports a single transducer head; and
    (b) two or more leaf spring members per said dual parallelogram spring means, whereby said two or more leaf spring members per dual parallelogram spring means allows only transverse transducer head structure movement relative to said leaf spring members, for the purpose of enabling accurate magnetic track reads with no lateral movement of the transducer head during read, write, or read/modify/write operations.

2. A magnetic head transducer assembly, comprising:
    (a) a housing means having two mounting surface portions wherein said surface portions include a plurality of track locating grooves;
    (b) spring means including a double parallelogram torsion box spring frame affix able to a magnetic head transducer;
    (c) end cap means removably fastened to the proximal ends of said spring means, said end caps including a plurality of mating protrusions corresponding to said plurality of said track locating grooves on said housing mounting surface means;
    (d) locking means located on said end cap means, whereby when said end caps are in place on the proximal ends of said spring means, slide into said housing mounting surfaces along said track locating grooves such that said track locating grooved mate with said protrusions on said end caps;
    (e) whereby said locking means secures said spring means and end cap means holding said magnetic head transducer moveably within said housing, and further whereby said spring means enables torsional and perpendicular movement of said magnetic head transducer during magnetic stripe card transduction operations; and (f) further whereby said spring means are securely held in said end cap means, are locked in position when a magnetic stripe card is inserted, and the friction between said end caps and said spring prevents any lateral movement of the magnetic head transducer.

3. A magnetic head transducer assembly according to claim 2, wherein said spring means includes:

(a) a C-shaped flexible frame means;

(b) two or more integral flexible leaf spring members;

(c) one or more magnetic head transducer attachment surfaces; and (d) end cap accepting means, including two open C-shaped end portions for accepting end caps.

4. A magnetic head transducer assembly according to claim 2, wherein said end cap means includes spring fastening slots allowing said spring means to be fastened to said end caps in such a way as to firmly and securely hold said spring means while allowing flex and movement of said spring means in relation to forces applied to a magnetic head transducer during magnetic stripe card transducing operations; and further wherein said spring means securely held in said end cap means, are locked in position when a magnetic stripe card is inserted, and the friction between said end caps and said spring means prevents any lateral movement of the magnetic head transducer.

5. A magnetic head transducer assembly according to claim 2, wherein said end caps are constructed of molded thermoplastic material.

6. A magnetic head transducer assembly according to claim 2, wherein said spring means has a C-shaped profile.

7. A magnetic head transducer assembly according to claim 2, wherein said spring means is constructed of metal material.

8. A magnetic head transducer assembly according to claim 2, wherein said housing means includes a card slot and a magnetic head transducer aperture.

9. A magnetic head transducer assembly according to claim 2, wherein said housing is constructed of molded thermoplastic material.

10. A magnetic head transducer assembly according to claim 2, wherein said locking means includes an end cap locking tab bar containing numerous mating protrusions for securely mounting said spring means and said end cap assembly within said housing means.

11. A torsion box spring frame for attachment to a magnetic head transducer comprising:

(a) a C-shaped flexible frame means;

(b) two or more integral flexible leaf spring members;

(c) one or more magnetic head transducer attachment surfaces; and (d) end cap accepting means, including two open C-shaped end portions for accepting end caps.

12. A torsion box spring frame for attachment to a magnetic head transducer, according to claim 11 wherein said flexible frame includes a dual parallelopiped shaped frame.

13. A torsion box spring frame for attachment to a magnetic head transducer, according to claim 11 wherein said magnetic head transducer attachment surfaces are welded to a magnetic head transducer.

14. A torsion box spring frame for attachment to a magnetic head transducer, according to claim 11 wherein said magnetic head transducer attachment surfaces are glued to a magnetic head transducer.

15. A torsion box spring frame means for attachment to a magnetic head transducer, according to claim 11 wherein said flexible frame and flexible leaf members act in unison to allow torsional movement and perpendicular movement of the magnetic head transducer during magnetic stripe card reading operations.

16. A method for making a magnetic head transducer assembly, comprising the steps of:

(a) providing housing means having two mounting surface portions wherein said surface portions include a plurality of track locating grooves;

(b) providing spring means including a double parallelogram torsion box spring frame affixable to a magnetic head transducer;

(c) providing end cap means removably fastened to the proximal ends of said spring means, said end cap means including a plurality of mating protrusions corresponding to said plurality of said track locating grooves on said housing mounting surface means;

(d) providing locking means located on said end cap means, whereby when said end cap means are in place on the proximal ends of said spring means, slide into said housing mounting surfaces along said track locating grooves such that said track locating grooves mate with said mating protrusions on said end cap means; and (e) assembling said end cap means and said spring means; and (f) mounting said end cap and spring assembly, whereby said locking means secures said spring means and end cap means holding said magnetic head transducer moveably within said housing, and further whereby said spring means enables torsional and perpendicular movement of said magnetic head transducer during magnetic stripe card transduction operations.

17. The method for making a magnetic head transducer assembly according to claim 16, wherein said step of providing spring means including a double parallelogram torsion box spring frame affixable to a magnetic head transducer, includes providing said spring means comprising a dual parallelogram spring having two or more leaf spring members per said parallelogram spring.

18. The method for making a magnetic head transducer assembly according to claim 16, wherein said step of providing end cap means includes end cap means having spring fastening slots allowing said spring means to be fastened to said end caps in such a way as to firmly and securely hold said spring means while allowing flex and movement of said spring means in relation to forces applied to a magnetic head transducer during magnetic stripe card transducing operations, and further wherein said spring means securely held in said end cap means, are locked in position when a magnetic stripe card is inserted, and the friction between said end caps and said spring means prevents any lateral movement of the magnetic head transducer.

19. The method for making a magnetic head transducer assembly according to claim 16, wherein said step of providing locking means located on said end cap means includes providing locking tabs on said locking means whereby said locking means secures said spring means and said end cap means holding said magnetic head transducer moveably within said housing, and further whereby said spring means enables torsional and perpendicular movement of said magnetic head transducer during magnetic stripe card transduction operations.

20. The method for making a magnetic head transducer assembly according to claim 16, wherein said step of providing housing means having two mounting surface portions wherein said surface portions include a plurality of track locating grooves, includes providing said housing means wherein said housing means is constructed of molded thermoplastic material.

* * * * *